(12) United States Patent
Shen et al.

(10) Patent No.: US 6,739,654 B1
(45) Date of Patent: May 25, 2004

(54) HEADREST-MOUNT DISPLAY MOUNTING STRUCTURE

(75) Inventors: Wen-Yen Shen, TaoYuan (TW); Jen-Chun Peng, ChungLi (TW)

(73) Assignee: Hexa-Chain Co., Ltd., Tao Yuan Hsien (TW)

( * ) Notice: Subject to any disclaimer, the term of this patent is extended or adjusted under 35 U.S.C. 154(b) by 0 days.

(21) Appl. No.: 10/421,730

(22) Filed: Apr. 24, 2003

(51) Int. Cl.7 ................................................. A47C 7/62
(52) U.S. Cl. ............................ 297/188.04; 297/188.05; 297/188.06; 297/217.3
(58) Field of Search .................. 297/217.3, 188.04, 297/188.05, 188.06, 185

(56) References Cited

U.S. PATENT DOCUMENTS

| | | | | |
|---|---|---|---|---|
| 3,449,011 A | * | 6/1969 | Edwards et al. ............. 297/391 |
| 3,795,422 A | * | 3/1974 | Robinson et al. ........... 297/146 |
| 4,589,124 A | * | 5/1986 | Ruiz ........................... 378/178 |
| 4,681,366 A | * | 7/1987 | Lobanoff ................ 297/188.06 |
| 4,702,519 A | * | 10/1987 | Lobanoff ..................... 297/185 |
| 5,267,775 A | * | 12/1993 | Nguyen .................... 297/217.3 |
| 5,507,556 A | * | 4/1996 | Dixon ...................... 297/217.3 |
| 5,713,633 A | * | 2/1998 | Lu ............................... 297/364 |
| 5,842,715 A | * | 12/1998 | Jones .......................... 280/727 |
| 6,033,018 A | * | 3/2000 | Fohl ....................... 297/216.13 |

* cited by examiner

Primary Examiner—Peter M. Cuomo
Assistant Examiner—Sarah C. Burnham
(74) Attorney, Agent, or Firm—Rosenberg, Klein & Lee

(57) ABSTRACT

A headrest-mount display mounting structure is disclosed to include a rectangular open base frame for fastening to the headrest of a vehicle seat, the base frame having two pivot holders at two sides, a front shell adapted to accommodate a display, the front shell having two pivots respectively supported in the pivot holders of the base frame, two locating members respectively fixedly fastened to the pivot holders to hold the pivots of the front shell in place, and a front cover fastened to the base frame and covered over the front shell.

2 Claims, 4 Drawing Sheets

HEADREST-MOUNT DISPLAY MOUNTING STRUCTURE

BACKGROUND OF THE INVENTION

1. Field of the Invention

The present invention relates generally to a display mounting structure and, more particularly, to a headrest-mount display mounting structure, which can easily be installed in the headrest of a vehicle seat to hold a display.

2. Description of the Related Art

Following fast development of high technology, electronic display devices are made thinner, and cheaper. Nowadays, thin layer display devices are intensively used in motor vehicles. However, it is difficult to install a display device inside a vehicle without hindering the view of the driver or the passengers. According to conventional methods, an electronic display device may be installed in the instrument panel, the console, or the ceiling. When an electronic display device installed in the instrument panel, the passenger in the back seat cannot see the display. When an electronic display device installed in the console, it may hinder the movement of the driver. When an electronic display device installed in the bottom side of the ceiling of a vehicle, the driver may be unable to see the image of the rear side of the vehicle from the rear-view mirrors.

SUMMARY OF THE INVENTION

The present invention has been accomplished under the circumstances in view. It is the main object of the present invention to provide a headrest-mount display mounting structure, which can easily be installed in the headrest of a vehicle seat to hold a display. It is another object of the present invention to provide a headrest-mount display mounting structure, which is practical for use in a motor vehicle without hindering the view angle of the driver. It is still another object of the present invention to provide a headrest-mount display mounting structure, which enables the user to adjust the angular position of the display conveniently.

According to one aspect of the present invention, the headrest-mount display mounting structure comprises a base frame shaped like a rectangular open frame for fastening to the headrest of a vehicle seat, the base frame comprising two pivot holders respectively fixedly provided at two opposite lateral sides thereof on the middle, the pivot holders each having a pivot bearing groove, and a plurality of coupling members arranged around the periphery thereof; a front shell adapted to accommodate a display, the front shell having two pivots symmetrically disposed at two opposite lateral sides thereof and respectively supported in the pivot bearing grooves of the pivot holders of the base frame; two locating members respectively fixedly fastened to the pivot holders to hold the pivots of the front shell in the pivot bearing grooves of the pivot holders for enabling the front shell to be turned relative to the base frame within an angle, the locating members each having a pivot bearing groove adapted to accommodate the pivots of the front shell; and a front cover fastened to the base frame and covered over the front shell, the front cover comprising a plurality of coupling members respectively coupled to the coupling members of the base frame. According to another aspect of the present invention, the pivot bearing grooves of the pivot holders and locating members and the periphery of each pivot of the front shell are respectively provided with fine teeth to increase friction between the pivots of the front shell and the pivot bearing grooves of the pivot holders and locating members.

DETAILED DESCRIPTION OF THE INVENTION

Figure 1:
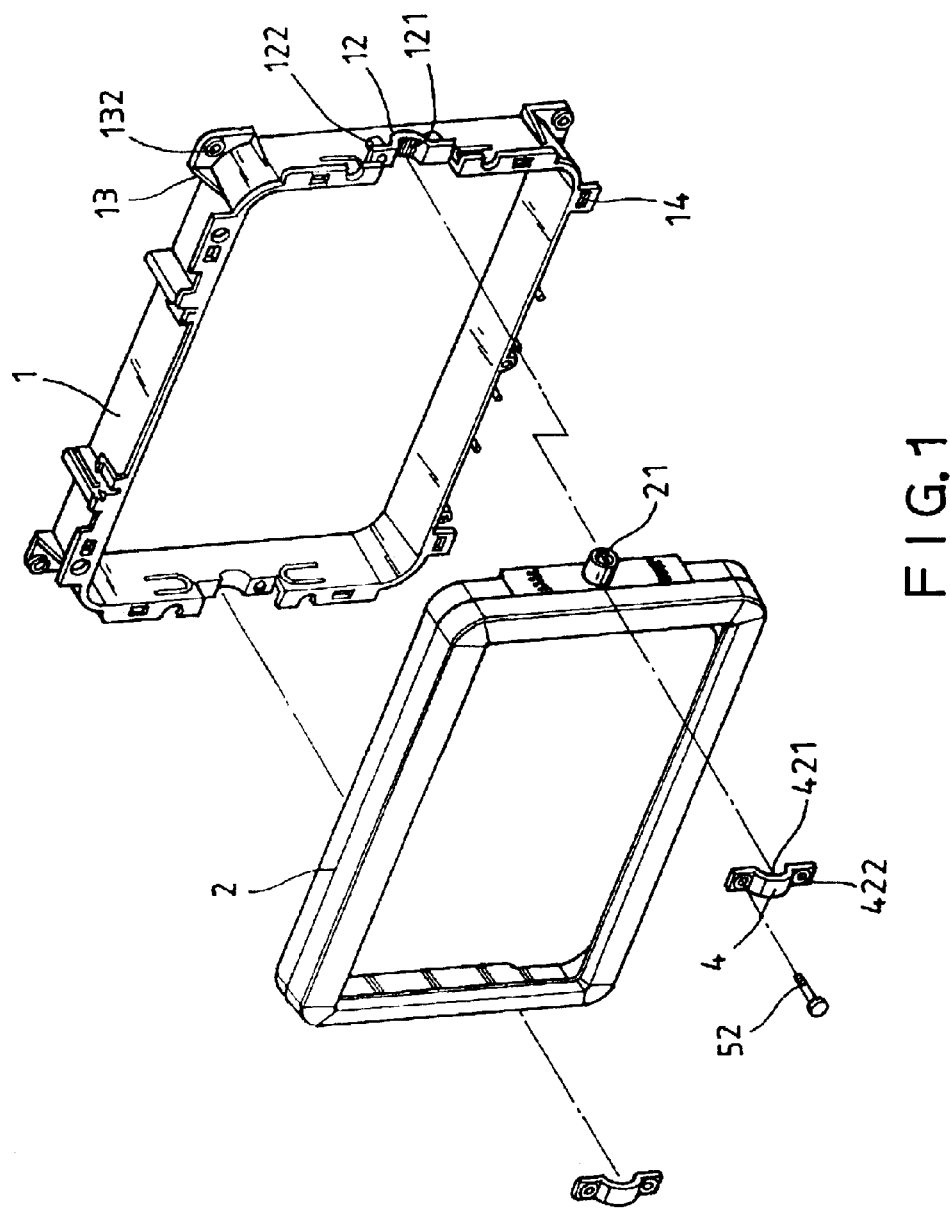
FIG. 1 is an exploded view of the preferred embodiment of the present invention (the front cover excluded).
Figure 2:
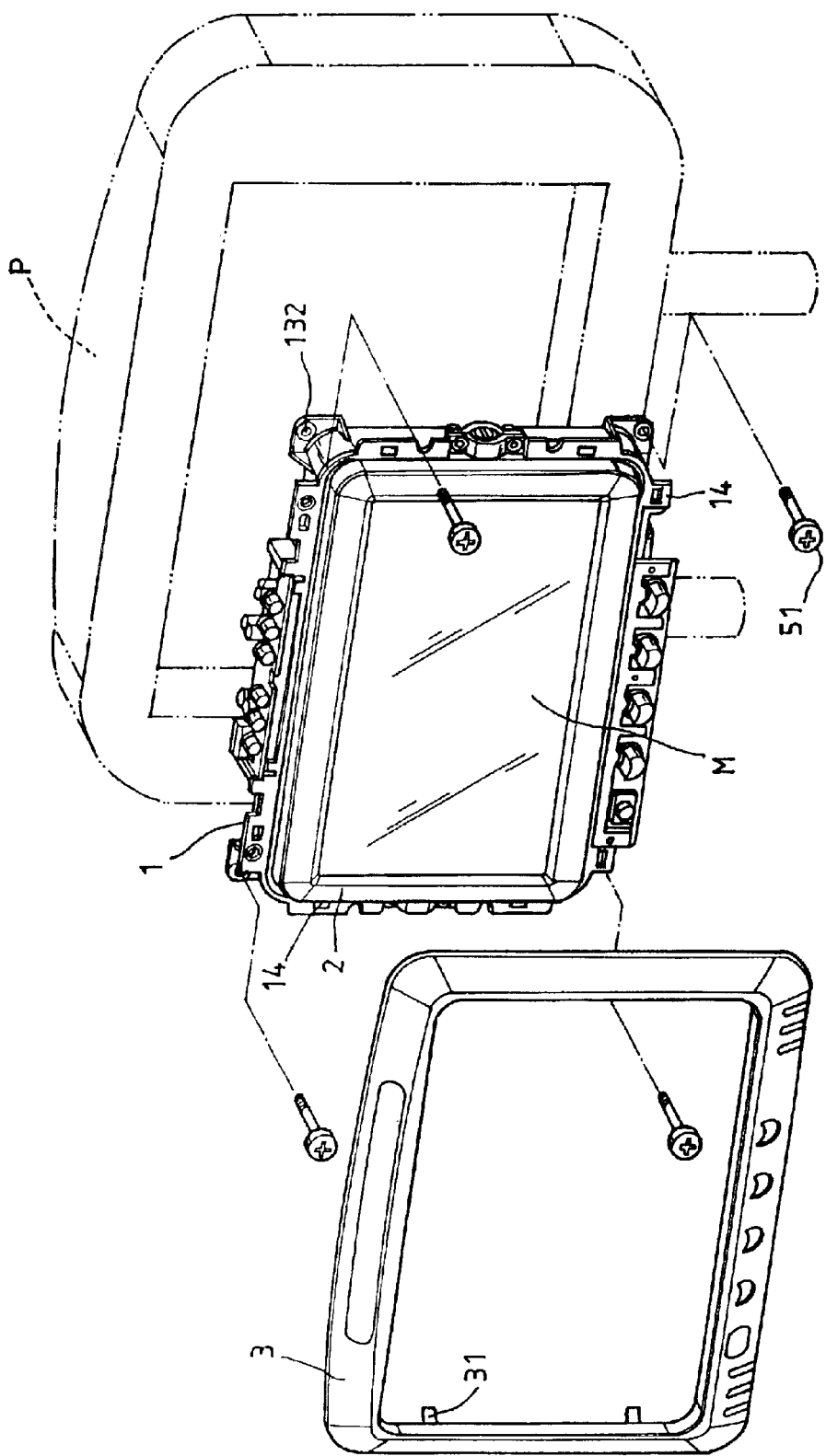
FIG. 2 is a schematic drawing showing the mounting of the present invention in the headrest of a vehicle seat.
Figure 3:
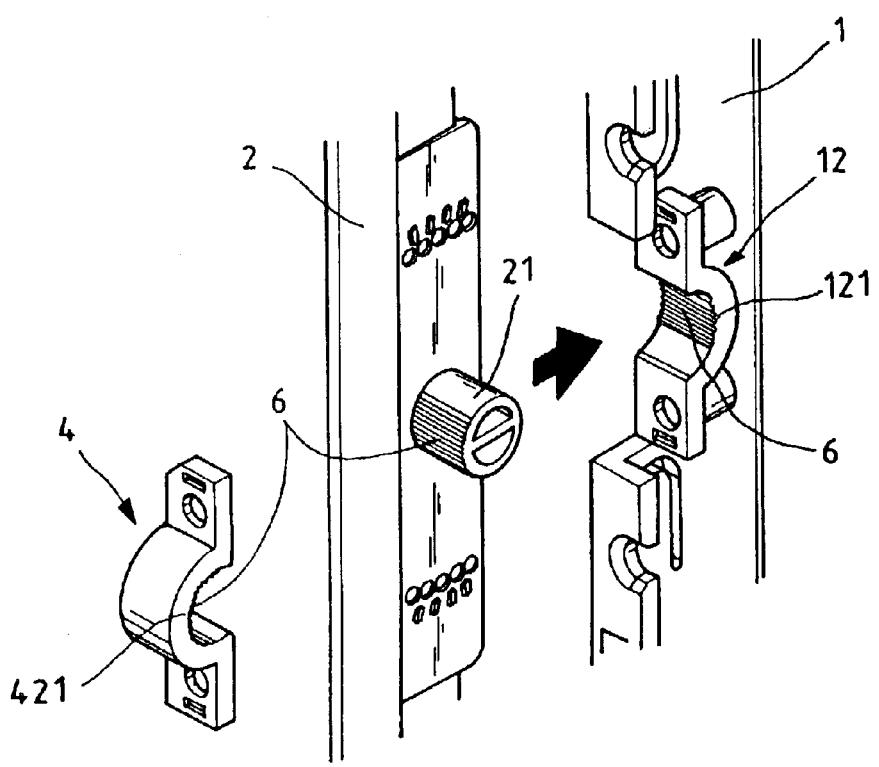
FIG. 3 is an exploded in an enlarged scale of a part of the present invention, showing the positioning of one pivot of the front shell between one pivot holder of the base frame and the corresponding locating member.
Figure 4B:
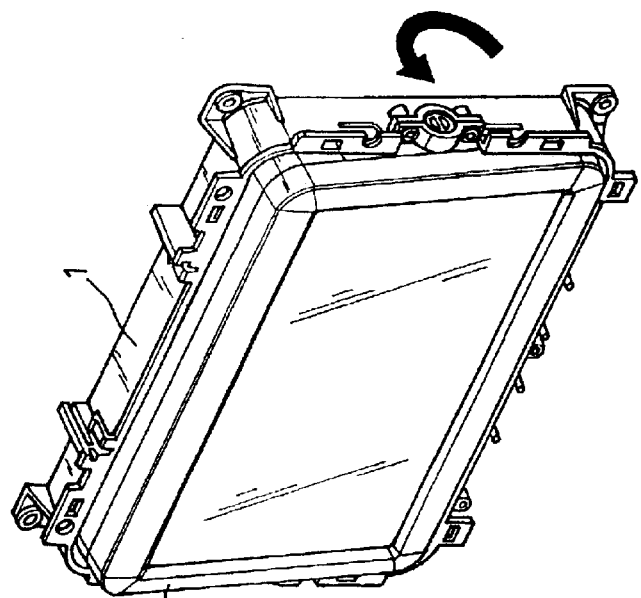
FIGS. 4a~4c are schematic drawings showing the front shell adjusted relative to the base frame between different angular positions.
Figure 4A:
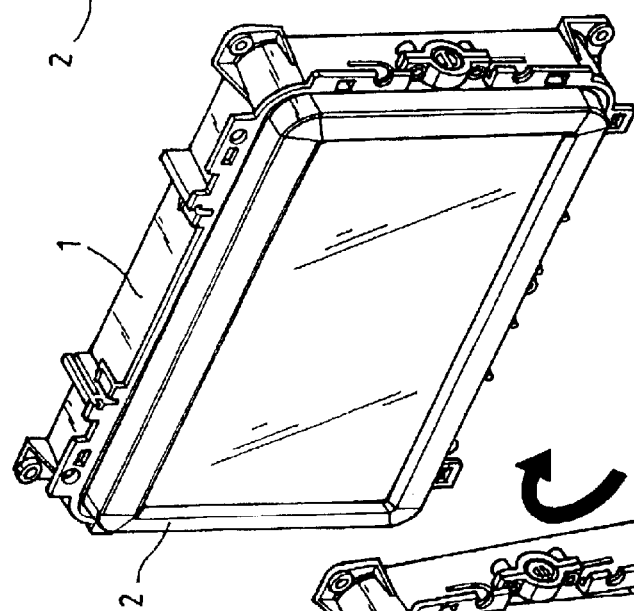
Figure 4C:
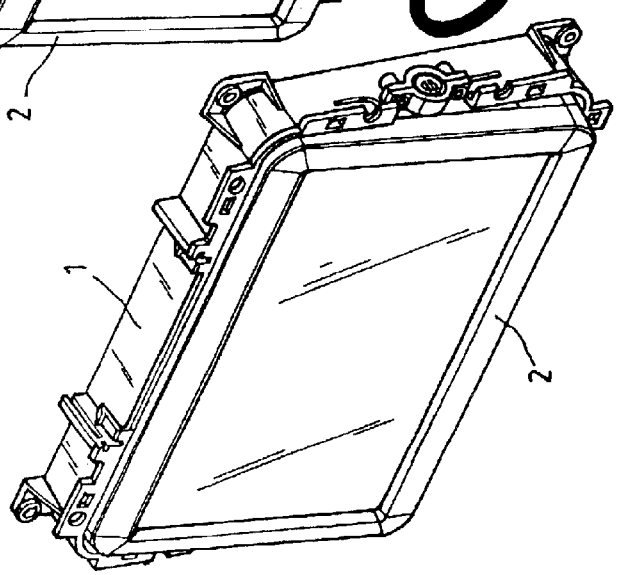

Referring to FIGS. 1 and 2, a headrest-mount display mounting structure in accordance with the present invention is shown comprised of a base frame 1, a front shell 2, a front cover 3, and two locating members 4. These component parts are respectively molded from plastics.

The base frame 1 is shaped like a rectangular open frame comprising two pivot holders 12 respectively fixedly provided at two sides on the middle, four mounting lugs 13 respectively protruded from the four corners at the back side, and a plurality of front hook holes 14 symmetrically arranged around the four peripheral walls at the front side. The mounting lugs 13 each have a mounting through hole 132. The pivot holders 12 each have a transversely extended groove 121 of semicircular cross section, and two mounting holes 122 at two sides of the groove 121.

The front shell 2 fits the base frame 1 and, is adapted to accommodate a display M, having two pivots 21 symmetrically disposed at two sides corresponding to the pivot holder plates 12 of the base frame 1.

The front cover 3 is a rectangular open frame fitting over the periphery of the front shell 2, having a plurality of hooks 31 protruded from the back wall and adapted to engage the hook holes 14 of the base frame 1.

The locating members 4 are similar to the pivot holders 12, each having a transversely extended groove 421 of semicircular cross section, and two mounting holes 422 at two sides of the groove 421.

During assembly process, the front shell 2 is mounted inside the base frame 1, keeping the pivots 21 respectively rested in the grooves 121 of the pivot holders 12, and then the locating members 4 are respectively attached to the pivot holders 12, and then screws 52 are respectively fastened to the mounting holes 422 of the locating members 4 and the respective mounting holes 122 of the pivot holders 12 to fixedly secure the locating members 4 to the pivot holders 12, keeping the pivots 21 pivotally positioned in between the respective pivot holders 12 and the respective locating members 4, and then the front cover 3 is covered on the base frame 1 by hooking the respective hooks 31 into the respective hook holes 14. When assembled, the whole assembly of the headrest-mount display mounting structure is attached to the headrest P, and screws 51 are respectively mounted in the mounting holes 132 of the mounting lugs 13 and driven into the headrest P to fixedly secure the headrest-mount display mounting structure and the loaded display M in place.

Referring to FIGS. 3 and 4a~4c, fine teeth 6 are formed in the grooves 121 of the pivot holders 12 of the base frame 1, the grooves 421 of the locating members 4 and the periphery of each pivot 21 of the front shell 2 to increase the friction between the pivots 21 and the knuckles formed of the pivot holders 12 and the locating members 4, therefore the front shell 2 is immediately positioned in position when released from the user's hand after an angular position adjustment.

A prototype of headrest-mount display mounting structure has been constructed within the features of FIGS. 1~4. The headrest-mount display mounting structure functions smoothly to provide all the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A display-mounted headrest for a vehicle seat comprising:
   a headrest having a recess formed at a rear portion thereof; and,
   a display assembly adjustably received in said recess of said headrest, said display assembly including:
      a base frame peripherally defining an open receiving space, said base frame comprising at least a pair of pivot holders respectively provided intermediately at opposing lateral sides thereof, said pivot holders each having a pivot bearing groove and a plurality of coupling portions offset therefrom, said pivot bearing groove having a toothed knuckle surface formed thereon;
      a front shell for capturing a display device within said open space of said base frame, said front shell having two pivots symmetrically disposed at two opposite lateral sides thereof and respectively supported in the pivot bearing grooves of the pivot holders of said base frame, at least one of said pivots having a toothed knuckle surface formed thereon for engaging said toothed knuckle surface of one said pivot bearing groove;
      at least two locating members respectively fastened to said pivot holders to hold the pivots of said front shell in the pivot bearing grooves of said pivot holders in an angularly adjustable manner, said locating members each having a pivot bearing groove adapted to accommodate the pivots of said front shell, at least one of said locating members having a toothed knuckle surface formed on said pivot bearing groove thereof for engaging said toothed knuckle surface of one said pivot; and,
      a front cover fastened to said base frame and covered over said front shell, said front cover comprising a plurality of coupling members respectively coupled to the coupling portions of said base frame.

2. The display-mounted headrest for a vehicle seat as claimed in claim 1, wherein each of the pivot bearing grooves of said pivot holders and said locating members and the periphery of each pivot of said front shell is provided with said toothed knuckle surface to increase friction between the pivots of said front shell and the pivot bearing grooves of said pivot holders and said locating members.

* * * * *